(12) United States Patent
Barde et al.

(10) Patent No.: US 7,669,082 B2
(45) Date of Patent: Feb. 23, 2010

(54) FAULT TOLERANT AND HANG RESISTANT MEDIA PROCESSING APPLICATIONS

(75) Inventors: Sumedh N. Barde, Redmond, WA (US); Kirt A. Debique, Seattle, WA (US); Alexandre V. Grigorovitch, Redmond, WA (US); Sohail Baig Mohammed, Redmond, WA (US); Patrick N. Nelson, Seattle, WA (US); Gurpratap Virdi, Bellevue, WA (US); Stephen C. Rowe, Bellevue, WA (US)

(73) Assignee: Microsoft Corporation

( * ) Notice: Subject to any disclaimer, the term of this patent is extended or adjusted under 35 U.S.C. 154(b) by 404 days.

(21) Appl. No.: 11/734,136

(22) Filed: Apr. 11, 2007

(65) Prior Publication Data
US 2008/0256539 A1 Oct. 16, 2008

(51) Int. Cl.
*G06F 11/00* (2006.01)
(52) U.S. Cl. .......................................... 714/25; 718/100
(58) Field of Classification Search ........................ None
See application file for complete search history.

(56) References Cited

U.S. PATENT DOCUMENTS

| | | | | |
|---|---|---|---|---|
| 5,903,728 A * | 5/1999 | Semenzato | .................. | 709/217 |
| 6,199,181 B1 * | 3/2001 | Rechef et al. | .................. | 714/38 |
| 6,330,689 B1 * | 12/2001 | Jin et al. | ........................ | 714/15 |
| 7,124,403 B2 * | 10/2006 | Price et al. | .................. | 717/127 |
| 2004/0034855 A1 * | 2/2004 | Deily et al. | .................. | 718/102 |
| 2004/0186601 A1 * | 9/2004 | Swenson et al. | .............. | 700/94 |
| 2006/0143536 A1 * | 6/2006 | Grey | ........................... | 714/38 |
| 2006/0294372 A1 * | 12/2006 | Maxa et al. | .................. | 713/165 |
| 2008/0022292 A1 * | 1/2008 | Gibson | ........................ | 719/328 |
| 2008/0033919 A1 * | 2/2008 | Arrouye et al. | ................ | 707/3 |
| 2008/0177552 A1 * | 7/2008 | Poimboeuf et al. | .......... | 704/500 |

OTHER PUBLICATIONS imon9, "Video Codec Unload & Multiple Audio Stream," www.quinnware.com [http://www.quinnware.com/forum/archive/index.php/t-3845.html].*

* cited by examiner

*Primary Examiner*—Gabriel L Chu
(74) *Attorney, Agent, or Firm*—Lee & Hayes, PLLC (57) ABSTRACT

Techniques for playing a media file in a multimedia application include launching a multimedia application as one process and automatically launching a pipeline of one or more media processing components as one or more isolated processes. In this manner, any untrustworthy components can be executed in an isolated process that is separate from the execution process of the multimedia application, thereby improving fault tolerance and hang resistance.

14 Claims, 8 Drawing Sheets

FAULT TOLERANT AND HANG RESISTANT MEDIA PROCESSING APPLICATIONS

BACKGROUND

Multimedia applications typically execute media files by multimedia processing, which is a very complex task. Oftentimes, multimedia processing hangs or crashes a multimedia application due to small mistakes arising in the codes of the multimedia application. Such problems arise when the multimedia application performs operations like playing a DVD, copying a CD to the computer hard drive, and so forth.

The codes in the multimedia application are usually complex and may be developed by multiple vendors who may or may not specialize in such code development. At present, the media processing applications, more precisely multimedia playback applications, include a multimedia pipeline to process the media files. The multimedia pipeline uses a third party codec (e.g. DivX) to decode and process the decompressed data from the media files to be presented to a user. Thus, if a failure occurs in the third party codec, a corresponding failure occurs in the multimedia playback application. Furthermore, crashing or hanging or any other improper functioning of the multimedia playback application results in unpredicted interruptions while the user listens to/views the media files. In addition, the third party codec can be susceptible to deliberate attacks designed to compromise the security of the system running the multimedia application.

SUMMARY

This summary is provided to introduce simplified concepts relating to, fault tolerant and hang resistant media processing applications, and these concepts are further described below in the detailed description. This summary is not intended to identify essential features of the claimed subject matter, nor is it intended for use in determining the scope of the claimed subject matter.

Techniques for playing a media file in a multimedia application are described. A user initiates execution of the media file, which is loaded into the multimedia application. As part of this operation, an isolation process is automatically launched to facilitate execution of one or more media processing components, such as those that are not trusted by the multimedia application. In this manner, any untrustworthy components can be executed in an isolated process that is separate from the execution process of the multimedia application, thereby improving fault tolerance and hang resistance.

BRIEF DESCRIPTION OF THE DRAWINGS

The detailed description is described with reference to the accompanying figures. In the figures, the left most digit(s) of a reference number identifies the figure in which the reference number first appears. The same numbers are used throughout the drawings to reference like features and components.

DETAILED DESCRIPTION

This disclosure relates to fault tolerant and hang resistant media processing applications. Media processing applications typically fail due to failures that occur in a multimedia pipeline incorporated within the media processing application. Specifically, failure of any single component within a multimedia pipeline can cause the media processing application to hang. Components are susceptible to failure due to various causes, including deliberate attacks, undetected programming flaws, and problems or incompatibilities with supporting hardware or software.

In the described media processing applications, the multimedia pipeline is separated from the media application. In one implementation, while executing the multimedia playback application, one or more media processing components are decoupled from the multimedia playback application and are placed in a separate multimedia pipeline. The media processing components in the separate multimedia pipeline can include components that function improperly occasionally. Thus, if one or more media processing components fail, the failure does not affect the multimedia playback application. A user interface (UI) may be provided to take appropriate actions upon encountering a failure, like automatically restarting the playback or presenting an error message to the user.

Note that although certain concepts are described below relative to a single processing pipeline, a multimedia application might make use of two or more such pipelines. For example, the multimedia application might use one processing pipeline for audio and another for video.

Exemplary System

Figure 1:
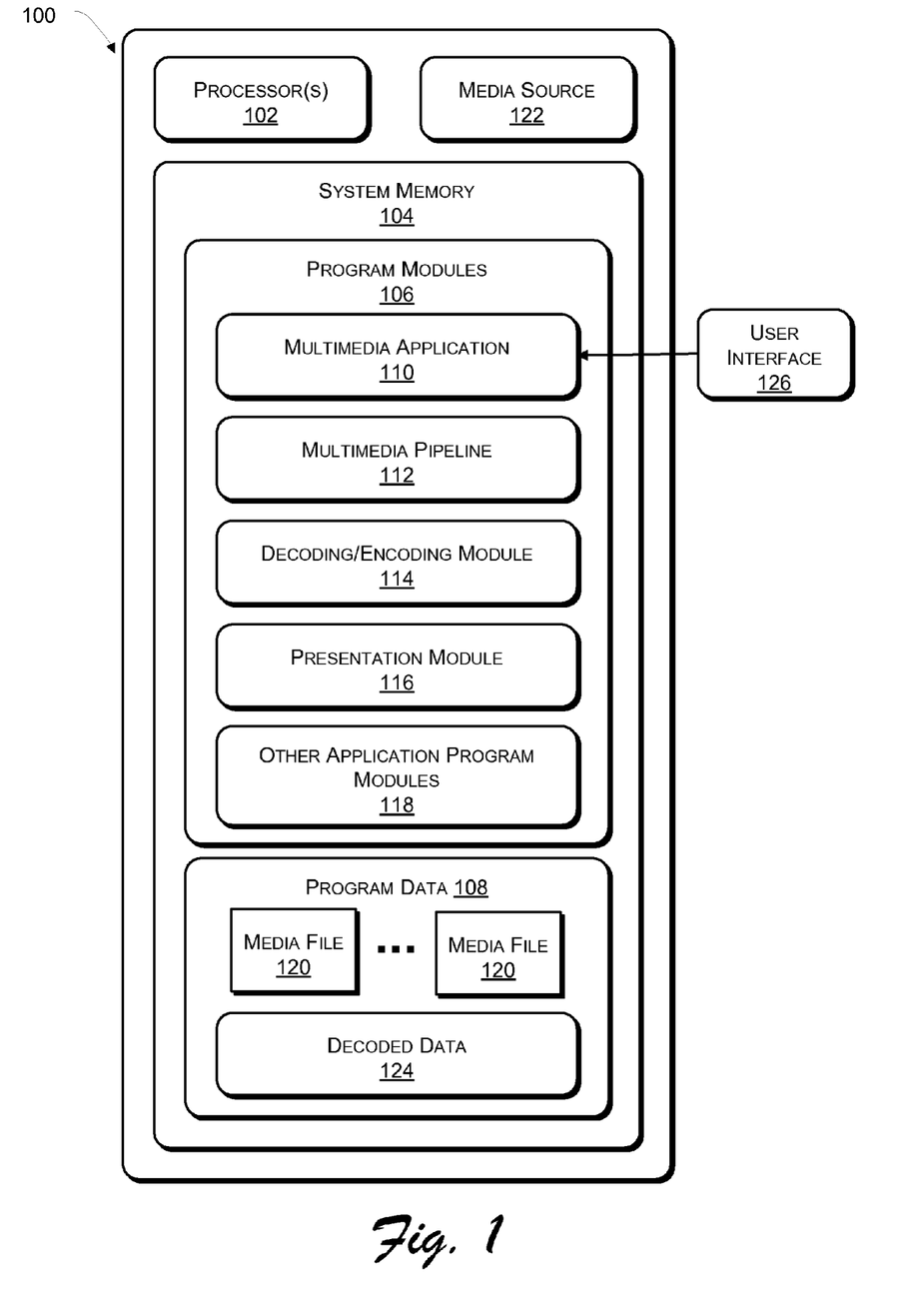
FIG. 1 is a block diagram with selected components in an exemplary system capable of processing media files obtained from a media source and presenting media files to a user.

FIG. 1 shows an exemplary system 100 that executes multimedia applications capable of processing media files obtained from a media source and presenting media files to a user. System 100 may be, for example, a general purpose computing device, a server, a laptop, a mobile phone, a mobile computing device, and/or so on. System 100 includes one or more processor(s) 102 and a system memory 104. Processor(s) 102 may be one or more microprocessors, microcomputers, microcontrollers, dual core processors, and so forth.

System memory 104 is representative of any number of memory arrangements including, for example, volatile random access memory (e.g., RAM) and non-volatile read-only memory (e.g., ROM, flash memory, etc.). System memory 104 is used to store one or more program modules 106 and program data 108. Program modules 106 generally include routines, programs, objects, components, data structures, etc., that perform particular tasks or implement particular abstract data types. In the illustrated implementation, program modules 106 include, for example, a multimedia application 110, a multimedia pipeline 112, a decoding/encoding module 114, a presentation module 116, and other application program modules 118, such as an Operating System (OS) to provide a runtime environment, networked communications between multiple users, and so forth.

As noted earlier, system 100 may be employed for receiving and processing a media file 120 obtained from a media source as well as for subsequently presenting contents of the media file 120 to the user. The media file 120 may include an image, an audio file, a video file, audio data, video data, image data, metadata, positional data, captions/text, and so forth that is pre-stored as part of program data 108. In the following discussion, components of the system 100 used to receive and process the media file 120 are described first, followed by an explanation of components involved in presenting the contents of the media file 120 to the user.

In an implementation, the multimedia application 110 receives the media file 120 from a media source 122. While the media source 122 is illustrated as being a part of system 100, it will be understood that the media source 122 may be associated indirectly with the system 100, such as through a network. The media source 122 may be external devices connected to the system 100, such as a CD player (Compact Disc Player), a DVD player (Digital Video Disc Player), a digital camera, a video camera, and so on.

In another implementation, the multimedia application 110 may receive the media file 120 from a memory device such as, a hard disk, a flash drive, and the like. On receiving the media file 120, the multimedia application 110 issues a command to play the media file 120 and to set up the multimedia pipeline 112 in the background. In one implementation, an instruction to play the media file 120 may be received via a user interface (UI) 126. The UI 126 may include one or more control buttons such as a play button, a pause button, a stop button, and so forth that facilitate control operations of the multimedia application 110. The multimedia pipeline 112 may include application program interfaces (APIs) that support task-like processing media files in the multimedia application 110 such as, for example, Direct Show, Windows Media Format SDK, Media Foundation, and the like.

The multimedia pipeline 112 is configured based on the process required to play the media file 120 received. The multimedia pipeline 112 may include any number of media processing components, such as the media source 122, the decoding/encoding module 114, and the presentation module 116. The multimedia pipeline 112 may include other modules or components in addition to those shown, and in any variety of combinations. Some exemplary combinations are described in detail with reference to FIGS. 2-6.

At least some components of the multimedia pipeline 112 operate within a separate, isolation process, independent of the multimedia application 110. The isolation process is launched automatically when the multimedia application 110 is initiated. Included in the isolation process are one or more media processing components of the multimedia pipeline 112 whose malfunctioning might otherwise adversely affect the operation of the multimedia application 110. With this isolation, faults, hangs, delays, exceptions, etc. that might occur within components of multimedia pipeline 112 do not disrupt the functioning of multimedia application 110 or the operating system generally.

Further protection against faulting multimedia components can be gained by restricting the execution rights or privileges of the isolation process. For example, the isolation process might be prevented from making certain operating system calls, from writing to non-volatile memory, or from initiating new processes. Such restrictions are designed to restrict the ability of any component within the isolation process from performing potentially harmful activities which might otherwise be initiated by faulty or intentionally malicious code somehow inserted within a component.

In one implementation, malicious activities are prevented by limiting the buffer sizes allotted to the isolation process, thereby preventing the insertion of unintended codes that may create vulnerabilities.

In one implementation, the decoding/encoding module 114 is included in the isolated multimedia pipeline 112. The decoding/encoding module 114 receives the media file 120 having compressed media data from the media source 122. The decoding/encoding module 114 decodes the compressed data to generate decoded data 124 and sends the decoded data 124 to the presentation module 116. The presentation module 116 processes and converts the decoded data 124 to a presentable format and subsequently sends the presentable format to the multimedia application 110. The multimedia application 110 displays the presentable format to the user.

Suppose, for example, a user wants to view/hear the media file 120, such as an AVI file in the multimedia application 110. In such a case, the user may access the AVI file through a user interface associated with the multimedia application 110. The multimedia application 110 invokes the isolation process to instruct the multimedia pipeline 112 that links the media source 122 (e.g. AVI source), the decoding/encoding module 114, and the presentation module 116. The media source 122 sends the AVI file to the decoding/encoding module 114 (e.g. third party DivX decoder) to be decoded. The decoding/encoding module 114 decodes the AVI file and forwards the decoded data 124 to the presentation module 116. The presentation module 116 plays back the decoded data 124 to the user through the multimedia application 110.

Exemplary Isolation Scenarios

FIGS. 2-6 illustrate various interactions between the multimedia application 110 and the multimedia pipeline 112 once set up in a separate, isolated process. The illustrated interactions are merely representative, and are not intended to be exhaustive.

Figure 2:
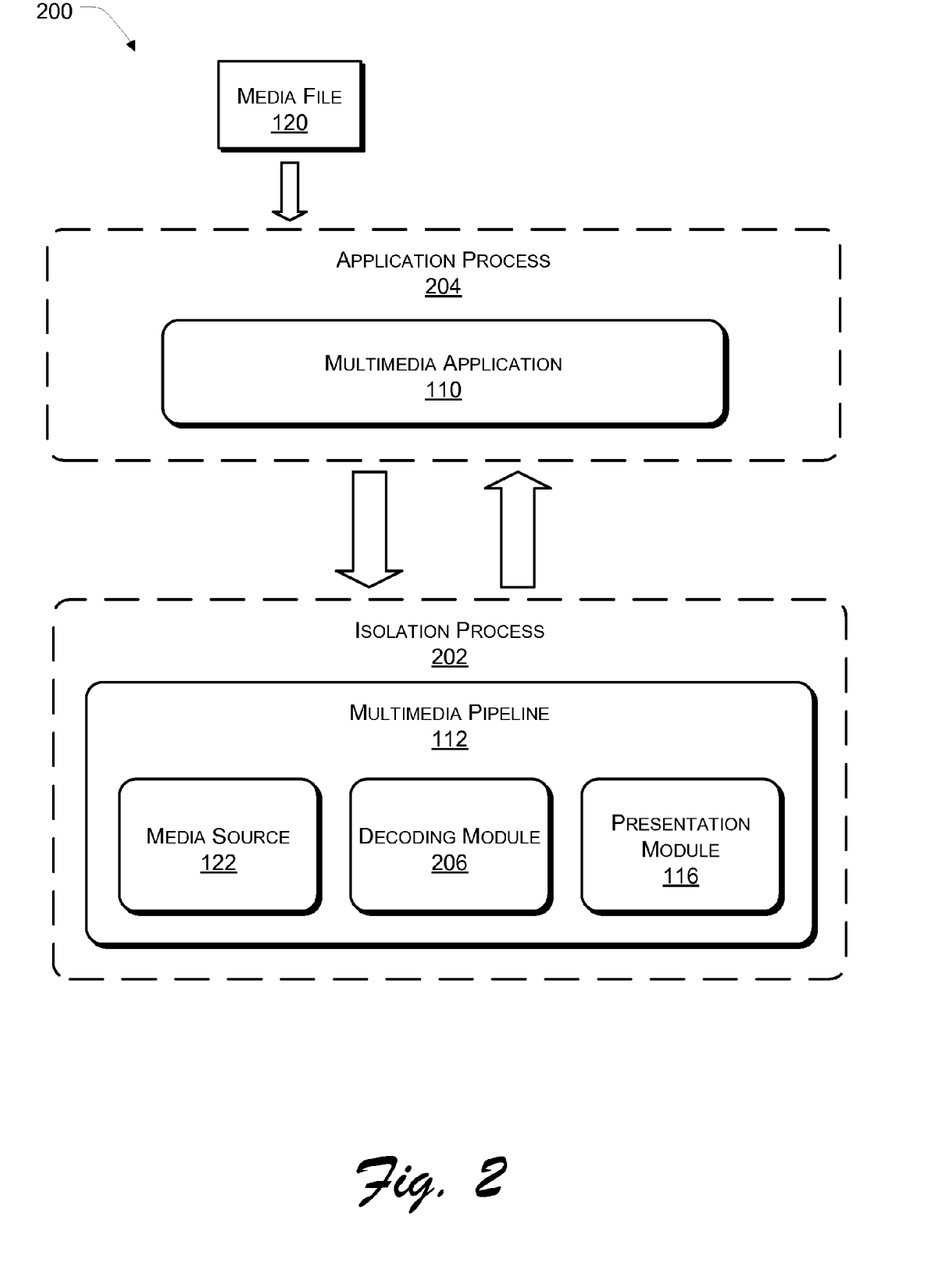
FIGS. 2-6 illustrate exemplary interactions between a multimedia application and one or more media processing components in a multimedia pipeline that execute in an isolation process separate from execution of the multimedia application.

FIG. 2 illustrates an interaction 200 between the multimedia application 110 and the multimedia pipeline 112 when launched in an isolation process 202 to receive, process, and playback a media file 120. The multimedia application 110 receives the media file 120 as input. In one implementation, the media file 120 can be received through the media source 122. Upon receiving the media file 120, the multimedia application 110 is initiated as a first process 204 or application process 204. Also, the multimedia pipeline 112 is launched as a second, separate isolation process 202, which operates separately from the first process 204 for the multimedia application 110.

The isolation process 202 includes media processing components that may create improper functioning of the multimedia application 110 and thereby pose a threat to system stability and security. There may be any number of media processing components in the multimedia pipeline 112. Here, there are three components illustrated in the multimedia pipeline 112: a media source 122, a decoding module 206, and a presentation module 116. This configuration is representative of a scenario in which the isolation process 202 converts the media file 120 to a presentable format that may be used by the multimedia application 110 for presentation to a user.

As part of this scenario, suppose the decoding module 206 (e.g., DivX decoder) is part of a codec manufactured by a third party vendor, which cannot be verified as trustworthy. In a worst case, the untrustworthy codec may function improperly occasionally as the untrustworthy codec may be corrupted or incompatible with the multimedia application 110. Such an improper functioning may affect operation of multimedia application 110 and thereby affect the working of the system as a whole. There may be many reasons that the untrustworthy the decoding module 206 is susceptible to faults. One possible situation is bit-depth incompatibility. That is, an operational parameter like bit depth associated with the decoding module 206 is different from the operational parameter (e.g. bit depth) of the multimedia application 110. For example, multimedia applications like Windows Media Player™ working in a Windows® Vista operating system of Microsoft Corporation support a bit depth of 64 bits. A third party coder/decoder (or codec) having a bit depth of 32 bits may not run on such applications. In the instant case, due to such incompatibility, the operating system may refuse to load the third party coder/decoder.

In our scenario of converting the media file 120 to a presentable format, the multimedia application 110 sends the media file 120 to the decoding module 206, where the media file 120 is decoded into the decoded data 124 (FIG. 1). The decoded data 124 is submitted to the presentation module 116 for presentation to the user. The presentation module 116 processes and converts the decoded data 124 to a presentable format. The decoded data 124 in the presentable format is sent to the multimedia application 110 in the first process 204 and subsequently displayed to the user through a user interface. Once the decoded data 124 is presented, the isolation process 202 may be closed. Alternatively, the isolation process 202 may be kept open until the multimedia application 110 is terminated by the user. In one implementation, if the user chooses to run another media file 120, the same isolation process 202 can be used to process the media file 120.

In the present case, any faults occurring in the decoding module 206 that might result in the decoding module crashing or hanging do not adversely impact operation of the multimedia application 110 because the decoding module 206 is isolated from the multimedia application 110 in a separate process. Such isolation, combined with restricted execution rights relative to multimedia application 110, further protects the system 100 from any malicious attacks.

Further, the application process 204 may continue to run even if one or more media processing components of isolation process 202, for example, decoding module 206, crashes, hangs, or experiences some other fault. In this case, the isolation process 202 will be restarted, as will the decoding module 206. The application process 204, however, need not be restarted once the decoding module 206 is restarted pursuant to the improper function.

In one exemplary implementation, the multimedia application 110 is provided with a facility to select a mode of multimedia processing from a set of modes. The set of modes include a combined process mode and a separate secure process mode. In the combined process mode, the interaction 200 performs an in-process multimedia processing. The in-process multimedia processing involves the operation of the isolation process 202 within the multimedia application 110. In contrast, the separate secure process mode enables the interaction 200 to be an out-of-process multimedia processing which involves the isolation of the isolation process 202 from the multimedia application 110. The selection of the modes is made based on a level of protection desired for content of the media file 120. In one implementation, the mode is selected by a user through a user interface.

Figure 3:
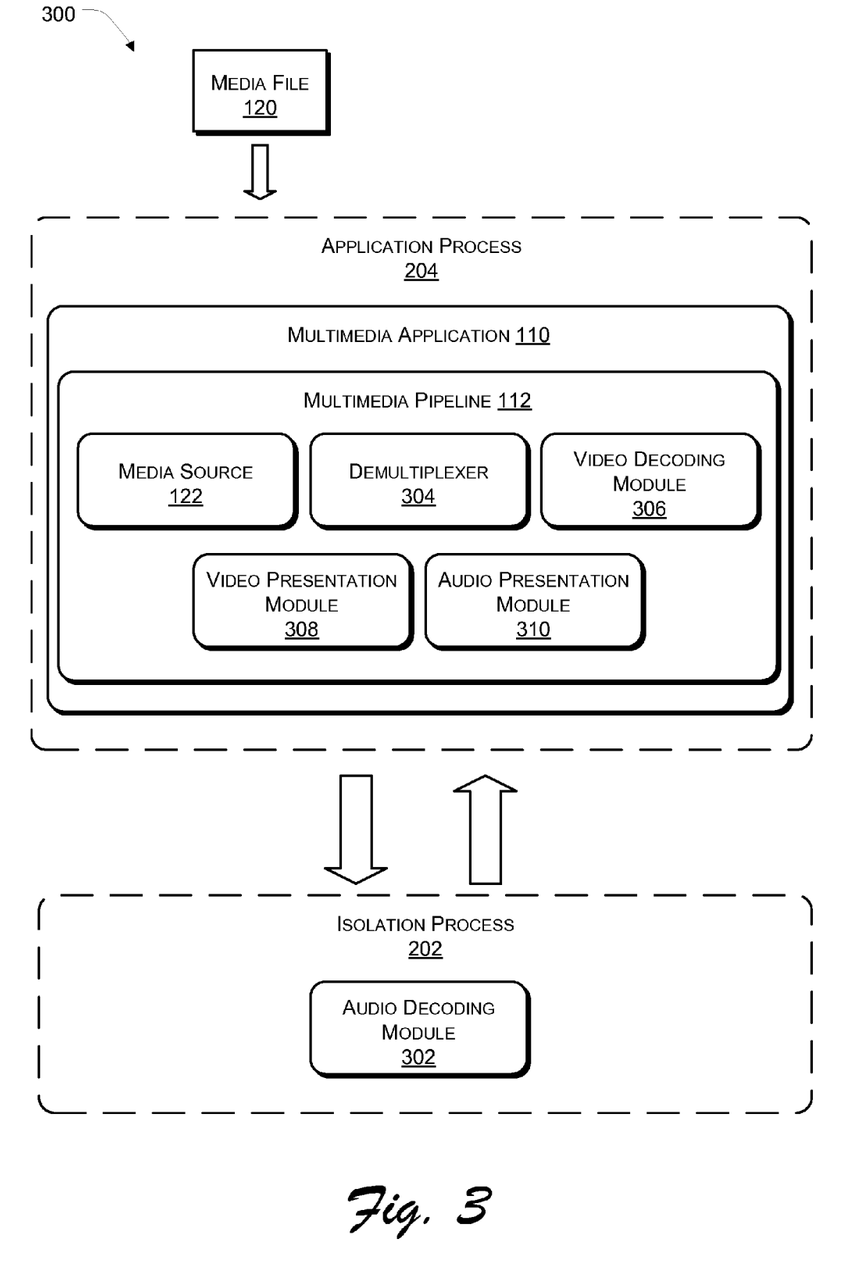

FIG. 3 illustrates another exemplary interaction 300 between the multimedia application 110 and a multimedia pipeline 112 to receive, process, and present the media file 120 to the user. As noted previously, certain components may not be trustworthy, and hence are suitable to isolated in a separate process. In interaction 300, an audio decoding module 302 is identified as an untrustworthy media processing component and thus, is shown executing in a separate process 202. It may be classified as untrustworthy for any number of factors, such as the module was developed by a manufacturer other than the manufacturer of the multimedia application 110, the module has been previously identified as being unreliable, and so forth.

The multimedia application 110 includes components deemed to be trustworthy. Here, the trusted components include media source 122, a demultiplexer 304, a video decoding module 306, a video presentation module 308, and an audio presentation module 310. The multimedia application 110 receives the media file 120 having an audio stream and a video stream, and loads the media file 120. In one implementation, the media file 120 can also be received through the media source 122. Thereafter, the multimedia application 110 creates the multimedia pipeline 112 within the application process 204. The media file 120 is sent to the demultiplexer 304, which separates the video stream from the audio stream. The demultiplexer 304 sends the video stream to the video decoding module 306, where the video stream is decoded. The decoded data is then passed to the video presentation module 308 for display to the user.

The audio stream is sent to the audio decoding module 302, which is executing in the separate, isolated process 202. In one implementation, the demultiplexer 304 stores the audio stream in a shared memory and the audio decoding module 302 accesses this shared memory to retrieve the stream. The audio decoding module 302 decodes the audio stream to generate the decoded audio data. The decoded audio data may be placed in the shared memory and returned to the multimedia application 110 for presentation to the user. In one implementation, data transfer via shared memory can implemented using an application program interfaces (APIs) that include, but are not limited to, Remote Procedure Calls (RPC).

In this example, by isolating just one component (i.e., the audio decoding module) in a separate process, any risk from failure or malicious activity by the untrusted component is reduced or eliminated.

In another implementation, the multimedia application 110 may receive the media file 120 such as an image file, a video file from an external capturing device like web camera, video camera, and the like. In some cases, such external capturing devices and encoders from third party vendors that form part of the multimedia pipeline 112 could be considered as untrusted components by the multimedia application 110.

Figure 4:
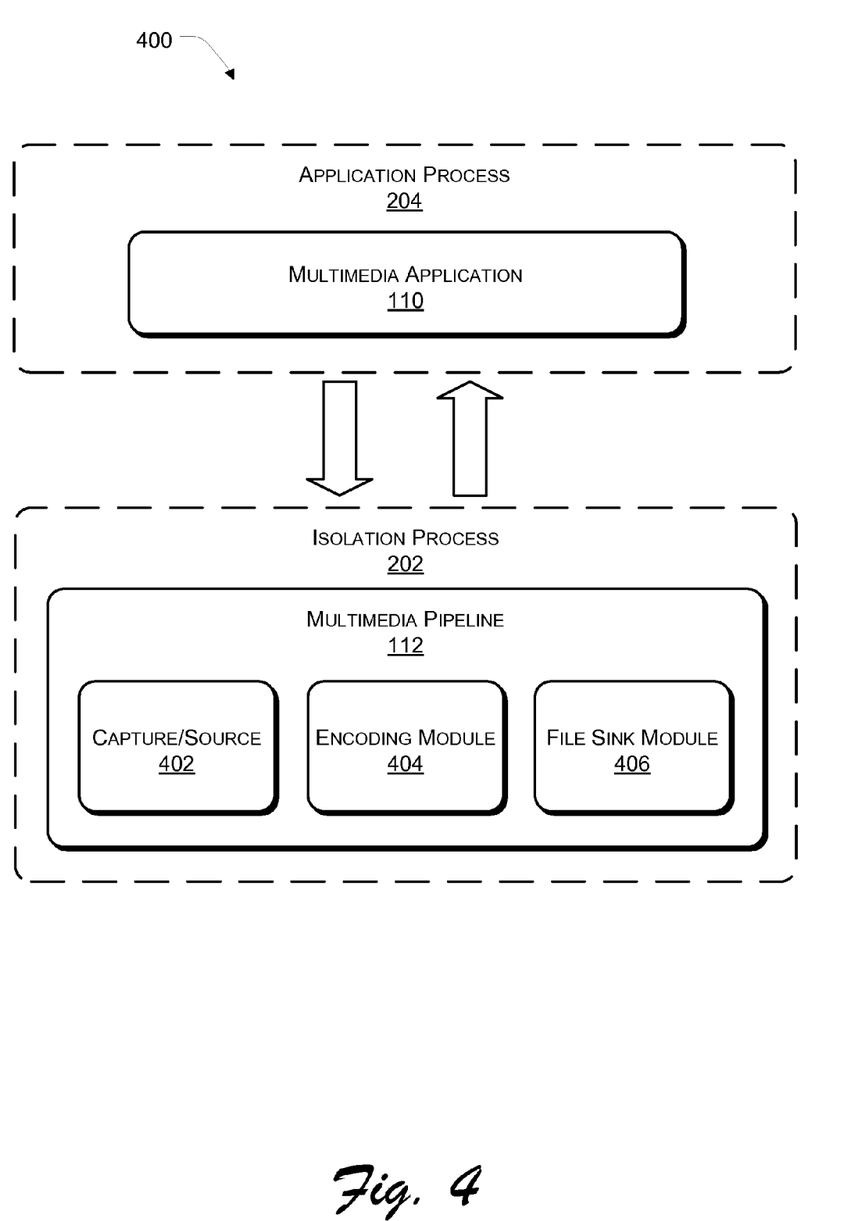

FIG. 4 illustrates such a possible interaction 400, where the media processing component that captures and processes the audio-visual data are isolated from the multimedia application 110. In this example, a capture/source 402, an encoding module 404, and a file sink module 406 are identified as potentially untrustworthy media components or as components that are otherwise marked for isolation. These untrustworthy components are executed within an isolation process 202 that is separate and removed from the execution of the multimedia application 110 in the application process 204.

The multimedia application 110 receives the media file 120 from the capture/source 402. The captured data includes audio-visual data such as audio and/or video streams, still images, sequence of still images representing scenes in motion, and so on. In one implementation, the capture/source 402 is implemented as image capturing devices, such as digital cameras, webcams, and so forth. The captured data is sent to the encoding module 404 which encodes the data. The encoded data may be stored in a shared memory and/or passed to the file sink module 406, which saves the encoded data in a storage space like a drive of the machine. The multimedia application 110 collects the encoded data and converts the encoded data to a presentable data to be presented to the user. In one implementation, the file sink module 406 updates the data to be presented in the multimedia application 110 with data stored in a shared memory. The encoded data is then processed by the multimedia application 110 to be ultimately presented to the user.

Figure 5:
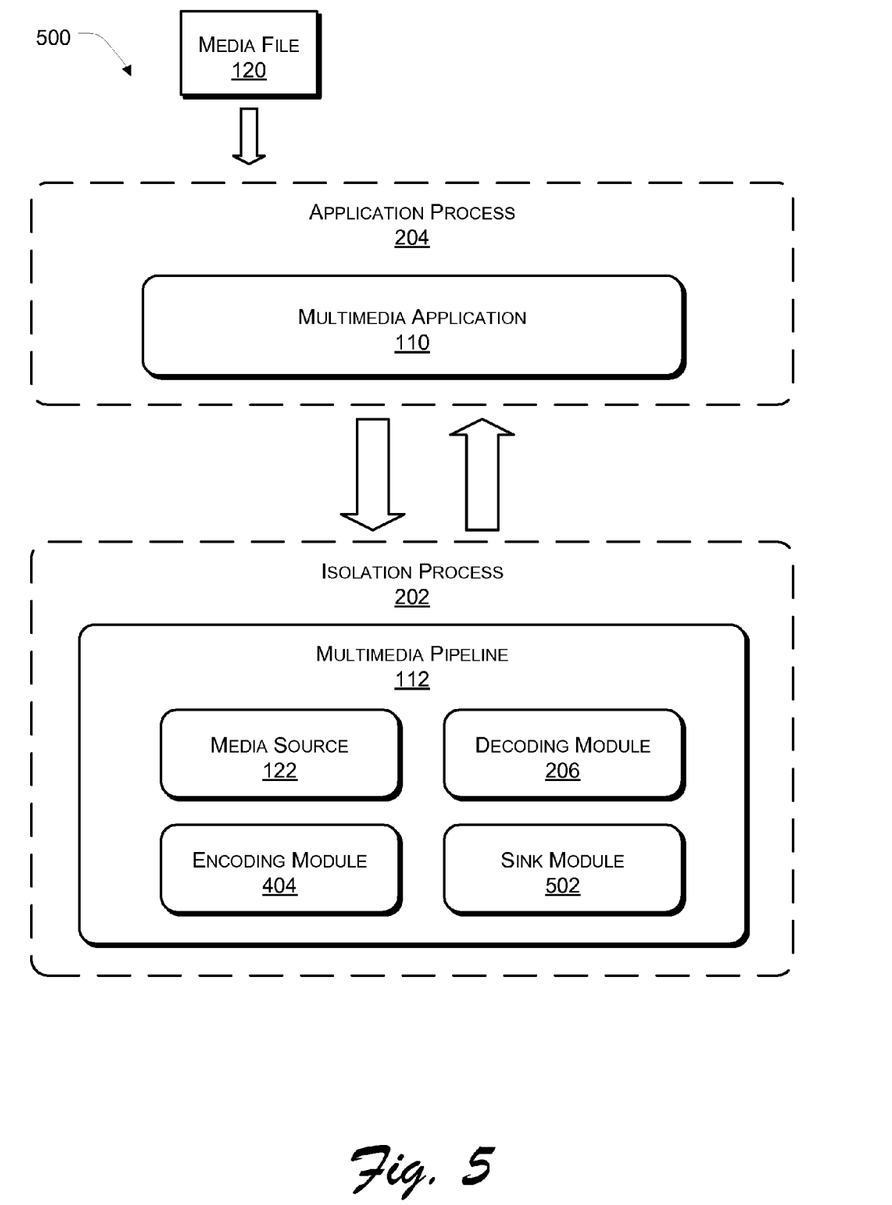

In another scenario, the multimedia pipeline 112 can include components for transcoding operations. For example, the multimedia pipeline 112 might include a decoding module 206 and an encoding module 404 for processing the media file 120, whereby these modules are developed by third party vendors and hence deemed untrustworthy by the multimedia application 110.

FIG. 5 illustrates such a possible interaction 500, where audio-visual data in the media file 120 is transcoded to convert the audio-visual data into a target format. The transcoding includes decoding the audio-visual data into an audio-visual data in an intermediate format and subsequently re-encoding the intermediate format to generate audio-visual data in the target format. The transcoded audio-visual data in the target format is then processed and finally presented to the user.

As shown in FIG. 5, the multimedia application 110 is executed in an application process 204, whereas the media source 122, the decoding module 206, the encoding module 404, and a sink module 506 are in an isolated process 202. The multimedia application 110 receives the media file 120 from the media source 122. The media file 120 is sent to the decoding module 206 which decodes original data in the media file 120 to generate the decoded data 124 in intermediate format. The intermediate format may be similar to the format of the original data. The decoding can be performed by techniques known in the art. As one example involving audio signals, the signals may be decoded from a compressed format like Dolby Digital to an uncompressed format like Pulse Code Modulation (PCM) which can be processed and then re-encoded to a compressed format.

The decoded data 124 is sent to the encoding module 404 which encodes the decoded data 124 to generate data in the target format acceptable by the multimedia application 110. There are many scenarios where this may be desired. For instance, an audio file in the intermediate format decoded from a DVD may be encoded in a target format that is native to an audio playback device, such as a certain portable entertainment device.

The encoded data is sent to the sink module 502, which saves the encoded data into a data storage space of the machine running the multimedia application 110. In one implementation, the sink module 502 updates data to be presented in multimedia application 110 with data stored in a shared memory. The encoded data is then processed by the multimedia application 110 for presentation to the user.

Figure 6:
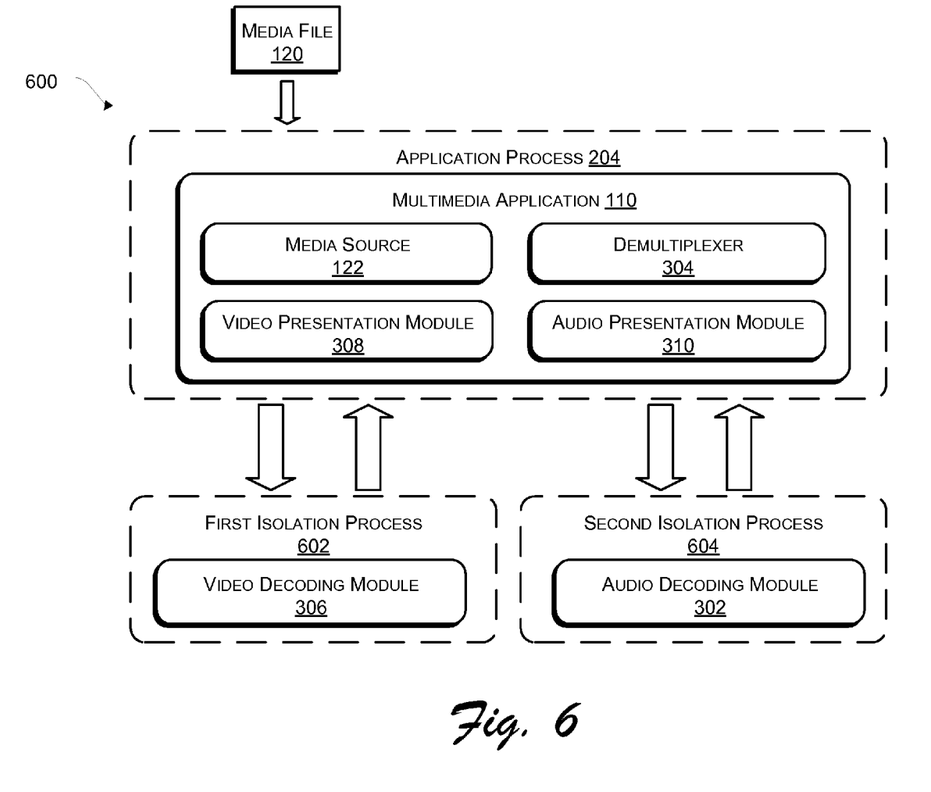

FIG. 6 illustrates another possible interaction 600 between the multimedia application 110 and components in a multimedia pipeline 112 to receive, process, and present the media file 120 to the user. In this interaction 600, there are multiple isolated processes, including a first isolation process 602 and a second isolation process 604 in addition to the application process 204 in which the multimedia application 110 is executing. Use of multiple isolation processes allows for separation of potentially faulty modules not only from the application, but also from each other.

As illustrated in FIG. 6, a video decoding module 306 and an audio decoding module 302 are deemed untrustworthy media processing components. The video decoding module 306 is executed as the first isolation process 602 and the audio decoding module 302 is executed as the second isolation process 604. The multimedia application 110 includes the media source 122, a demultiplexer 304, a video presentation module 308, and an audio presentation module 310. These components are classified as trusted components.

The multimedia application 110 receives and loads the media file 120 including an audio stream and a video stream. In one implementation, the media file 120 can also be received through the media source 122. The media file 120 is sent to the demultiplexer 304, which separates the video stream from the audio stream. The demultiplexer 304 sends the video stream to the video decoding module 306 and the audio stream to the audio decoding module 302.

In one implementation, the demultiplexer 304 stores the video stream in a primary shared memory and the video decoding module 306 accesses this first shared memory to retrieve the video stream. The video decoding module 306 decodes the video stream to generate the decoded video data. The decoded video data may be placed in the first shared memory and returned to the multimedia application 110 for presentation to the user. In one implementation, data transfer via first shared memory can implemented using an application program interfaces (APIs) that include, but are not limited to, Remote Procedure Calls (RPC).

In one implementation, the demultiplexer 304 stores the audio stream in a second shared memory and the audio decoding module 302 accesses this second shared memory to retrieve the stream. The audio decoding module 302 decodes the audio stream to generate the decoded audio data. The decoded audio data may be placed in the second shared memory and returned to the multimedia application 110 for presentation to the user. In one implementation, data transfer via second shared memory can be implemented using application program interfaces (APIs) that include, but are not limited to, Remote Procedure Calls (RPC).

Operation

An exemplary process for playing back a media file is described in this section with additional reference to FIGS. 1-6. FIGS. 1-6 provide an overview of interaction between the multimedia application and the isolation process to receive, process, and playback the media files. The exemplary processes may be described in the general context of computer executable instructions. Generally, computer executable instructions can include routines, programs, objects, components, data structures, procedures, modules, functions, and the like that perform particular functions or implement particular abstract data types. The processes may also be practiced in a distributed computing environment where functions are performed by remote processing devices that are linked through a communications network. In a distributed computing environment, computer executable instructions may be located in both local and remote computer storage media, including memory storage devices.

Figure 7A:
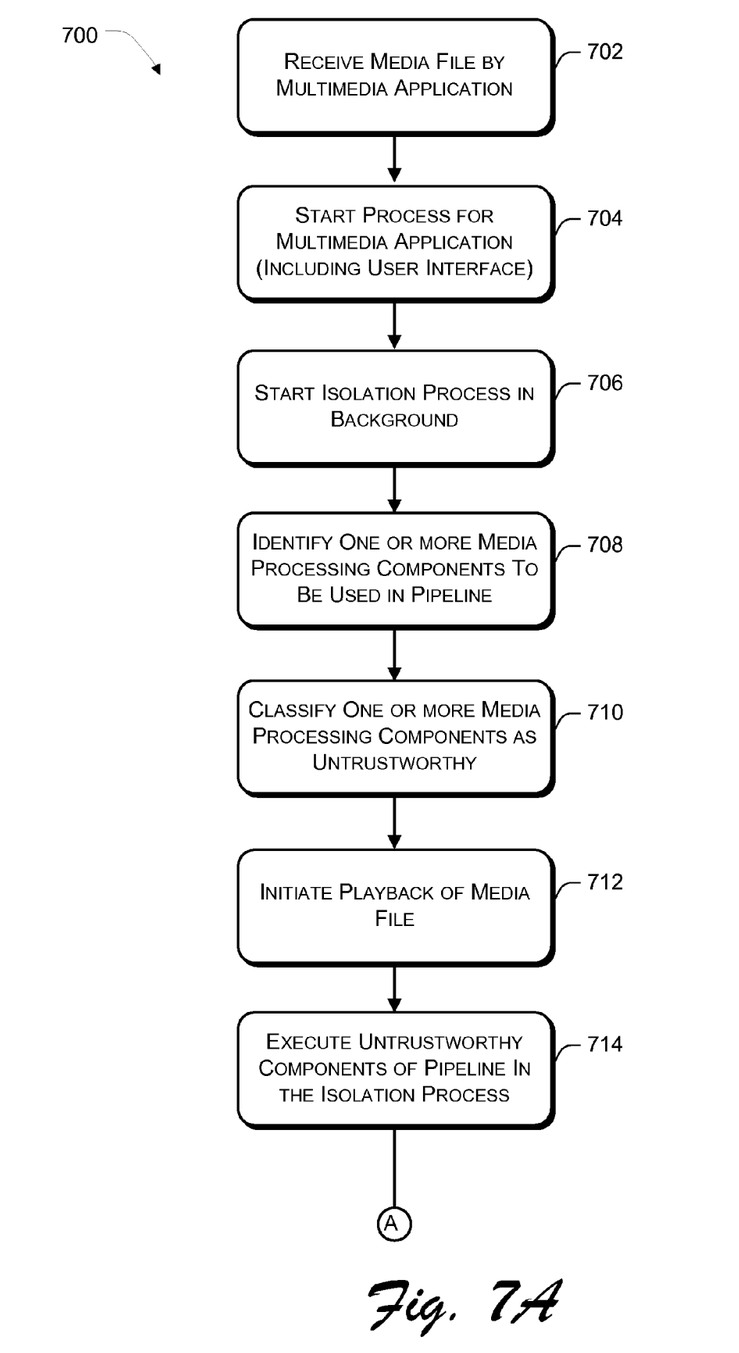
FIGS. 7A & 7B are flow diagrams showing an exemplary process for receiving and processing a media data and subsequently presenting contents of the media data to a user.
Figure 7B:
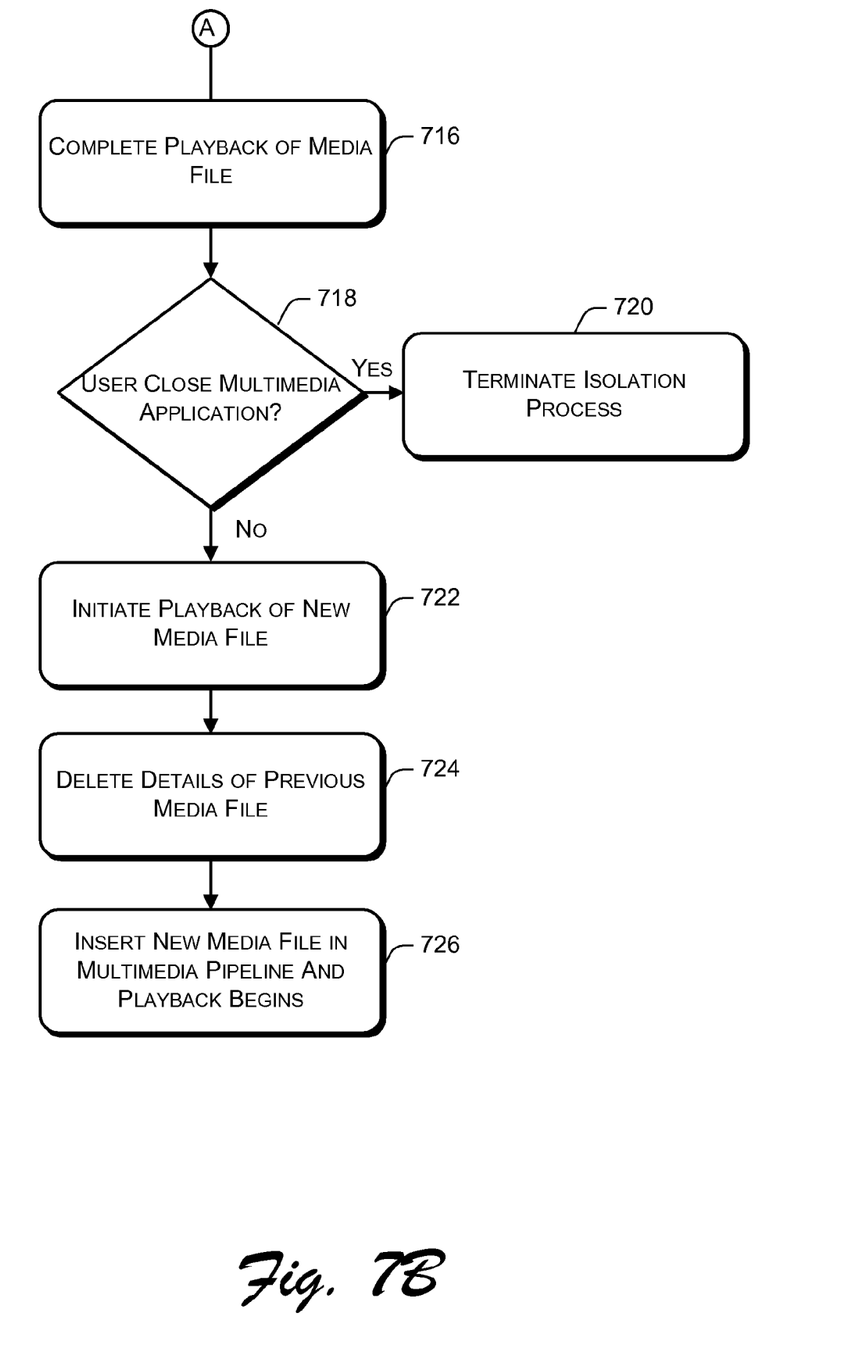

FIGS. 7A & 7B illustrate a general overall process 700 for playing a media file in a multimedia application. The process 700 is illustrated as a collection of blocks in a logical flow graph, which represents a sequence of operations that can be implemented in hardware, software, or a combination thereof. In the context of software, the blocks represent computer instructions that, when executed by one or more processors, perform the recited operations. The order in which the process is described is not intended to be construed as a limitation, and any number of the described blocks can be combined in any order to implement the process, or an alternate process. Additionally, individual blocks may be deleted from the process without departing from the spirit and scope of the subject matter described herein. For discussion purposes, the process 700 is described with reference to system 100 shown in FIG. 1 and various interaction scenarios shown in FIGS. 2-6.

At 702, a media file is received by the multimedia application 110. In one implementation, the media file 120 may be collected from the media source 122 or may be stored in the program data 108. At 704, once the media file 120 is received, a first process is started for execution of the multimedia application 110. As part of this launch, a user interface (UI) 126 is presented to the user to enable user control over playback of the media file 120.

At 706, an isolation process is started in the background and transparent to the user. Details of the media file 120 to be played may be stored for use by components that will execute in the isolation process.

At 708, one or more media processing components to be used in the multimedia pipeline are identified. At 710, certain ones of the media processing components are classified as untrustworthy. The multimedia application 110 classifies the media processing components as untrustworthy of any number of reasons. One criterion might be whether they are created by third party vendors. Another criterion might be whether the component has been previously identified as exhibiting faulty behavior. The untrustworthy media processing components will be executed in the isolation process. Examples of various components in different scenarios are described and shown with reference to FIGS. 2-6.

At 712, playback of the media file is initiated. For instance, the user employs the UI 126 to send a command to the multimedia application 110 to begin playback of the media file 120.

At 714, the multimedia pipeline is created, with the components classified as being untrustworthy being launched within the isolation process separate from the process in which the multimedia application 110 is executing. The multimedia pipeline 112 is created such that the components used are suitable for the format of the media file 120 such as MPEG-2, AVI, and so on. For example, if the media file 120 is a video file, the multimedia pipeline 112 will include audio/video processing components for processing the audio stream and video stream associated with the video file. Similarly, in the case of an audio file, the multimedia pipeline 112 is instrumented formulated to include audio processing components. By isolating the untrustworthy components, any unexpected faults or malicious activities occurring in the components are prevented from affecting operation of the multimedia application 110. Hence, the user is unaware of any problems in the media processing that, in conventional systems, are manifest as the multimedia application being "hung" or otherwise rendered inoperable.

At 716, playback of the media file is completed. The isolation process may be closed or could remain open irrespective of whether the multimedia application 110 is running or has been terminated. At 718, upon completion of playback, a determination is made whether the user has terminated the multimedia application. If so (i.e., the "yes" path from 718), the isolation process is terminated at 720. If the multimedia application 110 is not terminated by the user (i.e., the "no" path from 718), the multimedia application 110 waits for the user to provide further instructions.

At 722, playback of a new media file 120 is initiated by the user. The user may load the new media file 120 in the multimedia application 110 using the UI 126 and instruct the multimedia application 110 to process the new media file 120. At 724, details of the previous media file are deleted from the multimedia application. For example, once the new media file 120 is loaded into the multimedia application 110, the isolation process 202 deletes the details of the media file 120 that were previously played. In addition, the data associated with the previous media file 120 is deleted from the shared memory or otherwise marked as free space.

At 726, a new media file is inserted into the multimedia pipeline and playback of the new media file begins. The multimedia application 110 abstracts details associated with the new media file 120 and instructs the isolation process 210 to process the new media file 120 in the previously used multimedia pipeline 110. In one implementation, the multimedia application 110 may instruct the isolation process 202 to create a new multimedia pipeline 112 for playing back the new media file 120. The new multimedia pipeline 112 may be created to suit the formatting or type of the new media file 120.

Conclusion

Although embodiments of techniques for playing a media file in a multimedia application have been described in language specific to structural features and/or methods, it is to be understood that the subject of the appended claims is not necessarily limited to the specific features or methods described. Rather, the specific features and methods are disclosed as exemplary implementations techniques for playing a media file in a multimedia application.

What is claimed is:

1. A method, comprising:
   initializing a multimedia application to process a media file, wherein the initializing includes initiating an execution process for the multimedia application;
   executing one or more media processing components of a multimedia processing pipeline in one or more separate isolation processes to process the media file and generate media data; and
   restricting execution rights of the one or more separate isolation processes relative to the execution process of the multimedia application; and
      wherein the one or more media processing components possess a bit-depth different from a bit-depth of the multimedia application.

2. A method as recited in claim 1, further comprising restricting execution rights of the one or more separate isolation processes relative to the execution process of the multimedia application.

3. A method as recited in claim 1, further comprising executing additional media processing components of the multimedia processing pipeline in the execution process of the multimedia application.

4. A method as recited in claim 1, further comprising:
   classifying the one or more media processing components identified as untrustworthy; and
   executing any untrustworthy media processing components in the one or more separate isolation processes.

5. A method as recited in claim 1, further comprising:
   upon detecting a fault in the one or more isolation processes, terminating the isolation process without terminating the execution process of the multimedia application.

6. A computing device, comprising:
   a memory;
   one or more processors operatively coupled to the memory;
   a multimedia application stored in the memory and executable by the one or more processors, the multimedia application being executed in a first process and configured to play a media file; and
   a pipeline including a set of media processing components for processing the media file,
      wherein execution rights of a second process is restricted relative to the first process,
      wherein the media processing components have a bit-depth different from a bit-depth of the multimedia application, and
      wherein at least one media processing component in the pipeline is executed by the one or more processors as the second process that is isolated from the first process.

7. The computing device as recited in claim 6, wherein the set of media processing components includes untrustworthy media processing components.

8. The computing device as recited in claim 6, wherein the pipeline operates continuously subsequent to a failure of the one or more media processing components.

9. The computing device as recited in claim 6, wherein data is passed between the first and second processes using shared memory.

10. The computing device as recited in claim 6, wherein the second process that is isolated remains active subsequent to processing the media file.

11. One or more computer-readable media comprising computer executable instructions that, when executed, perform acts comprising:
    launching a multimedia application to execute a media file;
    initiating an isolation process separate from the multimedia application;
    executing one or more media processing components in the isolation process to process the media file; and
    granting restricted rights to the one or more media processing components in the isolated process to perform functions of an operating system,
        wherein the one or more media processing components have a bit-depth different from a bit-depth of the multimedia application.

12. One or more computer-readable media of claim 11, wherein the one or more media processing components in the isolation process form a pipeline.

13. One or more computer-readable media of claim 12, wherein the pipeline remains active subsequent to a failure of the one or more media processing components.

14. One or more computer-readable media of claim 11, further comprising an additional act of terminating the isolation process in an event of failure or malicious activity among the one or more media processing components, without terminating the multimedia application.

* * * * *